US012804088B2

(12) United States Patent
Takai et al.

(10) Patent No.: US 12,804,088 B2
(45) Date of Patent: Nov. 17, 2026

(54) INFORMATION PROCESSING APPARATUS AND IMAGE FORMING APPARATUS CAPABLE OF DISPLAY CONTROL OF THEIR DISPLAY DEVICE

(71) Applicant: KYOCERA Document Solutions Inc., Osaka (JP)

(72) Inventors: Kenji Takai, Osaka (JP); Hiroshi Nakagawa, Osaka (JP); Yoshifumi Okabayashi, Osaka (JP); Kohei Konishi, Osaka (JP); Kazuma Nomura, Osaka (JP); Keizen Kanazawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 260 days.

(21) Appl. No.: 18/769,635

(22) Filed: Jul. 11, 2024

(65) Prior Publication Data

US 2025/0030804 A1 Jan. 23, 2025

(30) Foreign Application Priority Data

Jul. 19, 2023 (JP) ................................ 2023-117897

(51) Int. Cl.
*H04N 1/00* (2006.01)

(52) U.S. Cl.
CPC ....... *H04N 1/0044* (2013.01); *H04N 1/00037* (2013.01); *H04N 1/00082* (2013.01); *H04N 1/00496* (2013.01); *H04N 2201/0094* (2013.01)

(58) Field of Classification Search
None
See application file for complete search history.

(56) References Cited

U.S. PATENT DOCUMENTS 5,134,390 A * 7/1992 Kishimoto ............ G06F 1/1601 348/836
5,949,408 A * 9/1999 Kang .................. G09G 3/3611 345/169
6,262,769 B1 * 7/2001 Anderson ............ H04N 1/2112 396/311
6,441,927 B1 * 8/2002 Dow .................. H04N 1/00416 358/473
8,024,658 B1 * 9/2011 Fagans ............... H04N 1/00196 715/730

(Continued)

FOREIGN PATENT DOCUMENTS

JP 2021100210 A 7/2021

*Primary Examiner* — Helen Zong

(74) *Attorney, Agent, or Firm* — IP Business Solutions, LLC.

(57) ABSTRACT

An image forming apparatus includes: a rotation mechanism capable of rotating a rectangular display device between a landscape orientation with longer sides being top and bottom and a portrait orientation with shorter sides being top and bottom; a detection sensor that detects switching of the display device between the landscape orientation and the portrait orientation; and a controller that, upon detection of switching of the display device from the landscape orientation to the portrait orientation by the detection sensor, enlarges a preview display area and allows a preview to be displayed in a size enlarged to fit the enlarged preview display area and displayed to make top and bottom edges of the preview parallel to the shorter sides of the display device.

5 Claims, 16 Drawing Sheets

(56) References Cited

U.S. PATENT DOCUMENTS

| | | | | |
|---|---|---|---|---|
| 2012/0086819 | A1* | 4/2012 | Wilson | H04N 21/4402 348/553 |
| 2012/0274539 | A1* | 11/2012 | Tashiro | H04N 1/00442 345/1.1 |
| 2014/0362402 | A1* | 12/2014 | Tsuboi | H04N 1/00456 358/1.15 |
| 2016/0071491 | A1* | 3/2016 | Berryman | G06F 3/0418 345/173 |
| 2019/0215406 | A1* | 7/2019 | Tomono | H04N 1/00148 |
| 2020/0344435 | A1* | 10/2020 | Choi | G06F 3/1454 |
| 2023/0359351 | A1* | 11/2023 | Liu | G06F 1/1641 |
| 2024/0056533 | A1* | 2/2024 | Kamoi | H04N 1/00074 |

* cited by examiner

PORTRAIT ORIENTATION

INFORMATION PROCESSING APPARATUS AND IMAGE FORMING APPARATUS CAPABLE OF DISPLAY CONTROL OF THEIR DISPLAY DEVICE

INCORPORATION BY REFERENCE

This application claims priority to Japanese Patent Application No. 2023-117897 filed on Jul. 19, 2023, the entire contents of which are incorporated by reference herein.

BACKGROUND

The present disclosure relates to information processing apparatuses and image forming apparatus capable of performing display control of their display devices.

Some types of information processing apparatuses, such as image forming apparatuses, include a rectangular display device having longer sides and shorter sides and capable of rotating its display screen between landscape and portrait orientations. For example, there is known an image forming apparatus including: a rectangular display device having longer sides and shorter sides; and a rotation mechanism that rotates the display device between a landscape orientation with the longer sides being the top and bottom and a portrait orientation with the shorter sides being the top and bottom.

SUMMARY

A technique improved over the aforementioned technique is proposed as one aspect of the present disclosure.

An information processing apparatus according to an aspect of the present disclosure includes an operation device, a display device, a rotation mechanism, a detection sensor, and a control device. The operation device accepts an input of a user's instruction. The display device is in a rectangular shape having longer sides and shorter sides. The rotation mechanism is capable of rotating the display device between a landscape orientation with the longer sides being top and bottom and a portrait orientation with the shorter sides being top and bottom. The detection sensor detects whether the display device is in the landscape orientation or the portrait orientation. The control device includes a processor and functions, through the processor executing a control program, as a controller. The controller allows the display device to display an operation screen including a preview display area where a preview of an image represented by image data is to be displayed and, during detection of the landscape orientation of the display device by the detection sensor, allows the preview to be displayed in the preview display area to make top and bottom edges of the preview parallel to the longer sides of the display device. When the operation device accepts an instruction to enlarge the preview while the landscape orientation of the display device is detected by the detection sensor and the operation screen is displayed on the display device, the controller enlarges the preview display area to change the preview display area to a first enlarged size and allows the preview to be displayed in a size enlarged to fit the preview display area enlarged to the first enlarged size. Furthermore, when orientation of the display device being detected by the detection sensor changes from the landscape orientation to the portrait orientation while the preview is displayed on the preview display area enlarged to the first enlarged size, the controller further enlarges the preview display area to change the preview display area to a second enlarged size and allows the preview to be displayed in a size enlarged to fit the preview display area enlarged to the second enlarged size and displayed to make the top and bottom edges of the preview parallel to the shorter sides of the display device.

An image forming apparatus according to another aspect of the present disclosure includes: the information processing apparatus according to the one aspect of the present disclosure; and an image forming device. The image forming device forms an image on a recording medium. The controller allows the display device to display a preview of an image to be formed by the image forming device.

DETAILED DESCRIPTION

Figure 1:
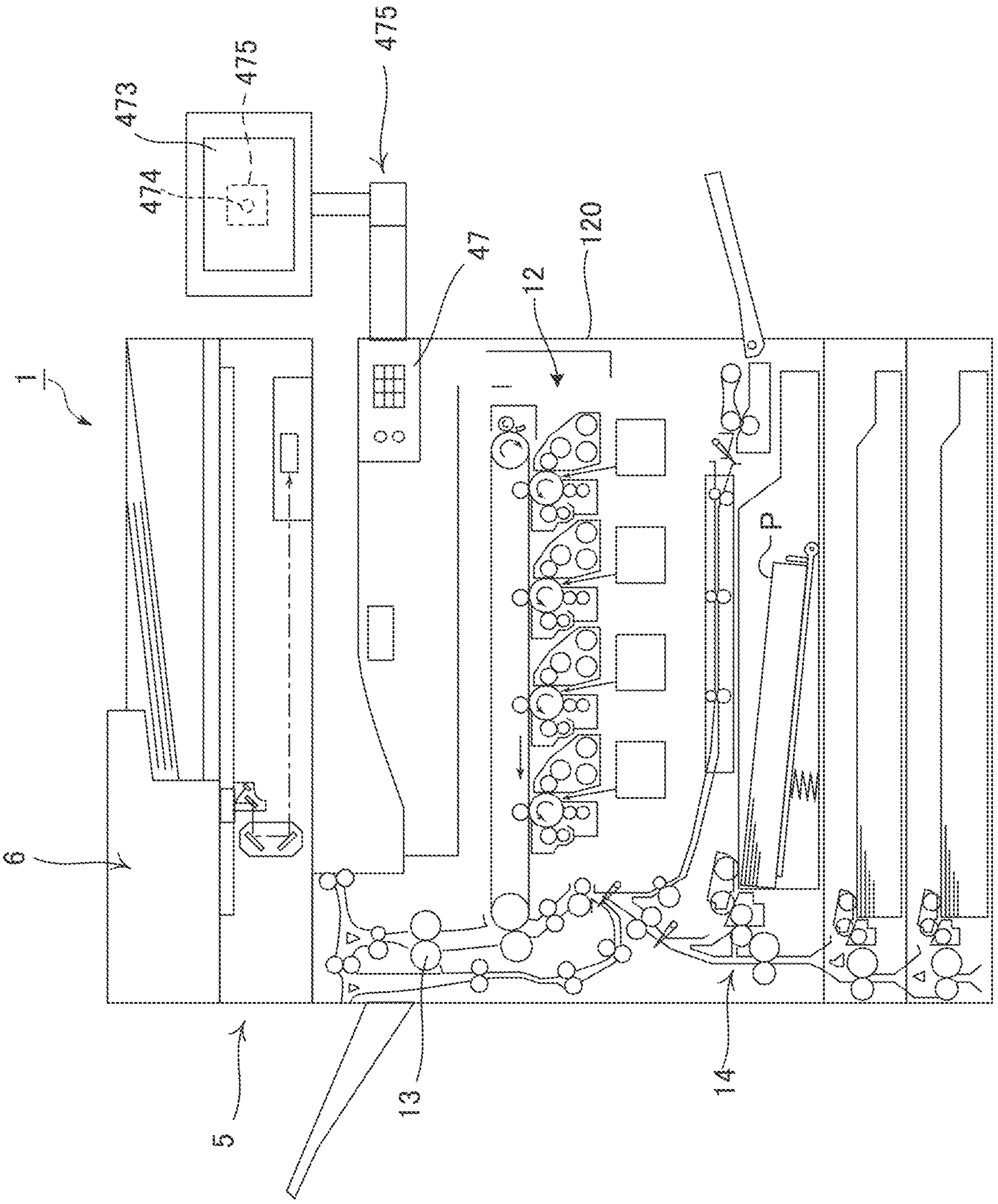
FIG. 1 is a frontal cross-sectional view showing the structure of an image forming apparatus according to one embodiment of the present disclosure.
Figure 2:
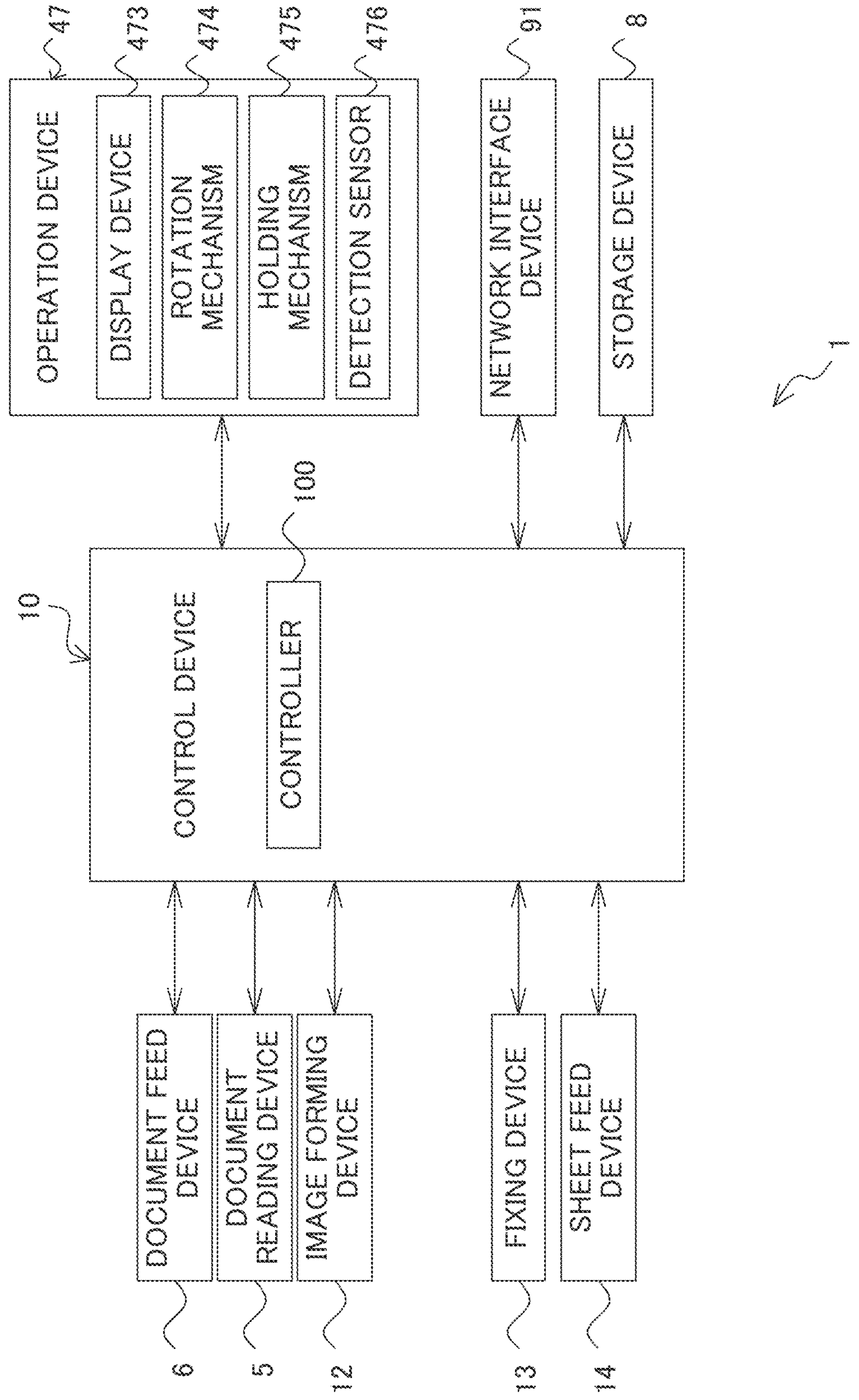
FIG. 2 is a functional block diagram schematically showing an essential internal configuration of the image forming apparatus according to the one embodiment of the present disclosure.

Hereinafter, a description will be given of an information processing apparatus according to one embodiment of the present disclosure with reference to the drawings. An information processing apparatus according to one embodiment of the present disclosure is, for example, an image forming apparatus. FIG. 1 is a frontal cross-sectional view showing the structure of an image forming apparatus according to one embodiment of the present disclosure. FIG. 2 is a functional block diagram schematically showing an essential internal configuration of the image forming apparatus according to the one embodiment of the present disclosure. Hereinafter, directional terms, such as right, left, top, bottom, and other like terms, may be used, but they are directions shown as examples with respect to the drawings unless otherwise stated.

An image forming apparatus 1 according to this embodiment is, for example, a multifunction peripheral having multiple functions, such as a copy function, a print function, a scan function, and a facsimile function. The image forming apparatus 1 is made up by including a control device 10, a document feed device 6, a document reading device 5, an image forming device 12, a fixing device 13, a sheet feed device 14, an operation device 47, a network interface device 91, and a storage device 8.

The document feed device 6 is capable of being opened and closed with respect to the top surface of the document reading device 5 by being mounted by unshown hinges or the like on the top surface of the document reading device 5. The document feed device 6 functions as a document holding cover while the document reading device 5 reads an original document sheet placed on an unshown platen glass. Furthermore, the document feed device 6 is an ADF (auto document feeder), includes an unshown document loading tray, and feeds original document sheets loaded onto the document loading tray to the document reading device 5 sheet by sheet.

The document reading device 5 includes a scanner or the like and reads, with the scanner or the like, an original document sheet fed from the document feed device 6 or an original document sheet placed on the platen glass.

First, a description will be given of the case where a document reading operation is performed on the image forming apparatus 1. The document reading device 5 optically reads an image of an original document sheet fed to the document reading device 5 by the document feed device 6 or an image of an original document sheet placed on the platen glass and generates image data on the original document sheet. The image data generated by the document reading device 5 is saved in an unshown image memory or the like.

Next, a description will be given of the case where an image forming operation is performed on the image forming apparatus 1. The image forming device 12 is a mechanism that includes, for each color, a photosensitive drum, a charging device, an exposure device, a developing device, and a primary transfer device and forms an image on a recording paper sheet by secondary transfer using an intermediate transfer belt. Based on image data generated by the document reading operation, image data stored in the image memory or the like, image data received from a computer connected via a network or another image data, the image forming device 12 forms a toner image on a recording paper sheet as a recording medium fed from the sheet feed device 14 to create a printed matter. The sheet feed device 14 includes a sheet feed cassette and further includes a pick-up roller that picks up a recording paper sheet from the sheet feed cassette and feeds it to the image forming device 12, a conveyance roller, a conveyance path, and a rotation drive mechanism for the rollers.

The fixing device 13 includes a heating roller, a pressing roller, and a drive mechanism that drives these rollers into rotation. At the nip between both the rollers, the fixing device 13 applies heat and pressure to the recording paper sheet with the toner image formed thereon by the image forming device 12, thus fixing the toner image on the recording paper sheet. The recording paper sheet subjected to the fixation processing is ejected to an unshown sheet output tray.

The operation device 47 includes various types of hard keys to be operated by the user and accepts, according to user's operation on the hard keys, user's instructions for various types of operations and processing executable by the image forming apparatus 1, such as an instruction to execute an image forming operation.

The operation device 47 includes: a display device 473 that displays operation guidance and other types of information for the operator; a rotation mechanism 474; a holding mechanism 475; and a detection sensor 476. Furthermore, the operation device 47 accepts, through a touch panel provided on the display device 473, input of a user's instruction based on an operation (a touch gesture) of the user on the screen being displayed on the display device 473.

The display device 473 is a rectangular display having longer sides and shorter sides and is formed of a liquid crystal display (LCD) or the like. When the operator makes a touch gesture on a button or key being displayed on the screen, the touch panel accepts an instruction associated with a point where the touch gesture has been made. In this case, the touch panel functions as an operation device.

The holding mechanism 475 is an arm-shaped member for use in attaching the display device 473 to an apparatus body 120 of the image forming apparatus 1. The holding mechanism 475 supports the display device 473 freely rotatably with respect to the holding mechanism 475 and holds the display device 473 in a manner to temporarily fix it in a landscape orientation or a portrait orientation. The holding mechanism 475 includes respective engagement portions formed of recesses provided at positions thereof opposed to the display device 473 to correspond to the landscape-oriented position and the portrait-oriented position of the display device 473. The side of the display device 473 opposed to the holding mechanism 475 is provided with projections fittable with the engagement portions. When the display device 473 is rotated to the landscape orientation (see FIGS. 3A and 3G) or the portrait orientation (see FIG. 3D), one of the recesses is fitted on the corresponding projection and, thus, the above orientation of the display device 473 is fixed and held.

The rotation mechanism 474 is interposed between the holding mechanism 475 and the display device 473. In other words, the holding mechanism 475 supports the display device 473 freely rotatably through the rotation mechanism 474. The rotation mechanism 474 includes a rotary shaft and the rotary shaft is freely rotatably supported by the holding mechanism 475. The rotary shaft is attached to a central portion of the side of the rectangle display device 473 opposed to the holding mechanism 475 simultaneously rotatably with the display device 473. The rotary shaft is provided at its peripheral surface with a cam (to be described hereinafter) simultaneously rotatable with the rotary shaft.

Figures 3A, 3B, 3C, 3D, 3E, 3F, 3G:
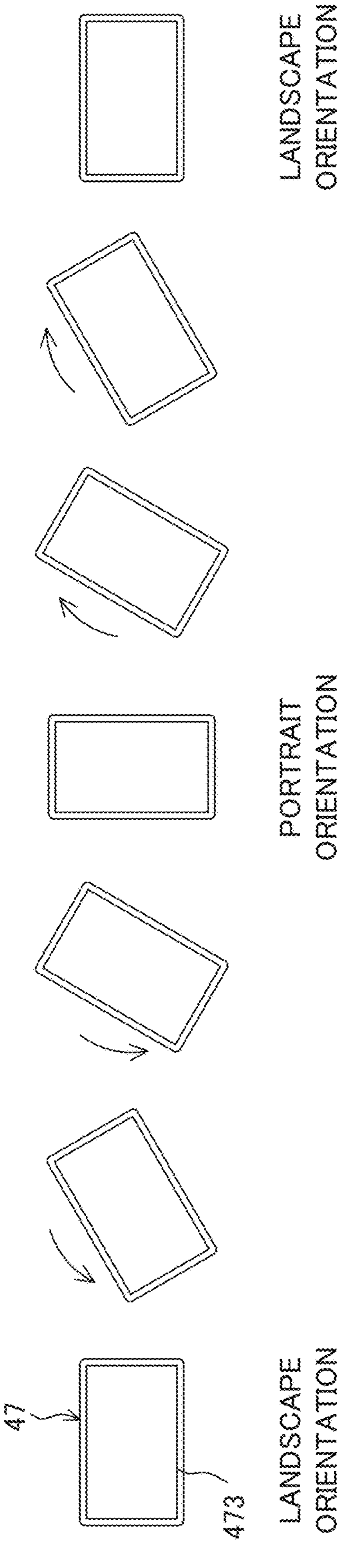
FIGS. 3A to 3G are views for illustrating an example of rotation of a display device.

FIGS. 3A to 3G are views for illustrating an example of rotation of the display device 473. When the landscape-oriented display device 473 shown in FIG. 3A is rotated counterclockwise in FIG. 3 as shown in FIGS. 3B to 3D, it changes to the portrait orientation. Furthermore, when the portrait-oriented display device 473 shown in FIG. 3D is rotated clockwise as shown in FIGS. 3E to 3G, it changes to the landscape orientation.

In other words, the rotation mechanism 474 has a structure capable of rotating the display device 473 counterclockwise in FIG. 3 as viewed from the front surface of the display device 473 to switch the display device 473 from the landscape orientation to the portrait orientation. The range of angles of rotation of the display device 473 is not limited to 90 degrees, but the case where the range of angles of rotation is 90 degrees is taken as an example in this embodiment. The directions of rotation of the display device 473 and the structure for switching the display device 473 from the landscape orientation to the portrait orientation are not limited to the above and this embodiment is simply illustrative.

The detection sensor 476 is a switching mechanism that detects the landscape orientation and the portrait orientation of the display device 473. The switching mechanism is provided at a location where it is pushed by a cam lobe (a raised portion) of the cam attached to the rotary shaft when the display device 473 is in the portrait orientation. When pushed by the cam lobe, the switching mechanism outputs an ON signal (a Low signal) to the control device 10. In other words, the switching mechanism is disposed at a location where it is not pushed by the cam lobe when the display device 473 is in an orientation other than the portrait orientation.

As the structure of the rotation mechanism 474 rotating the display device 473 counterclockwise in FIG. 3 as viewed from the front surface of the display device 473 to switch the display device 473 from the landscape orientation to the portrait orientation, for example, a structure may be employed in which the approach of the cam lob to the switching mechanism is allowed only during counterclockwise rotation of the display device 473 and not allowed during clockwise rotation of the display device 473 (such as a structure in which, in a clockwise approach path of the cam lobe toward the switching mechanism, a projection engageable with the cam lobe is provided around the switching mechanism).

Figure 4A:
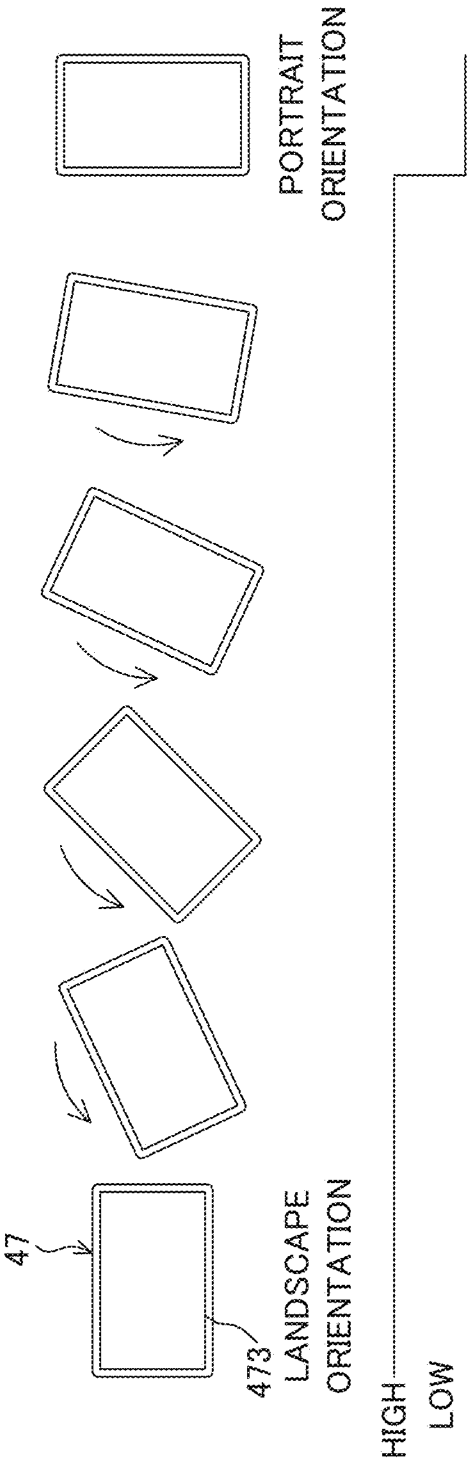
FIGS. 4A and 4B are views for illustrating changes of a signal output from a detection sensor.
Figure 4B:
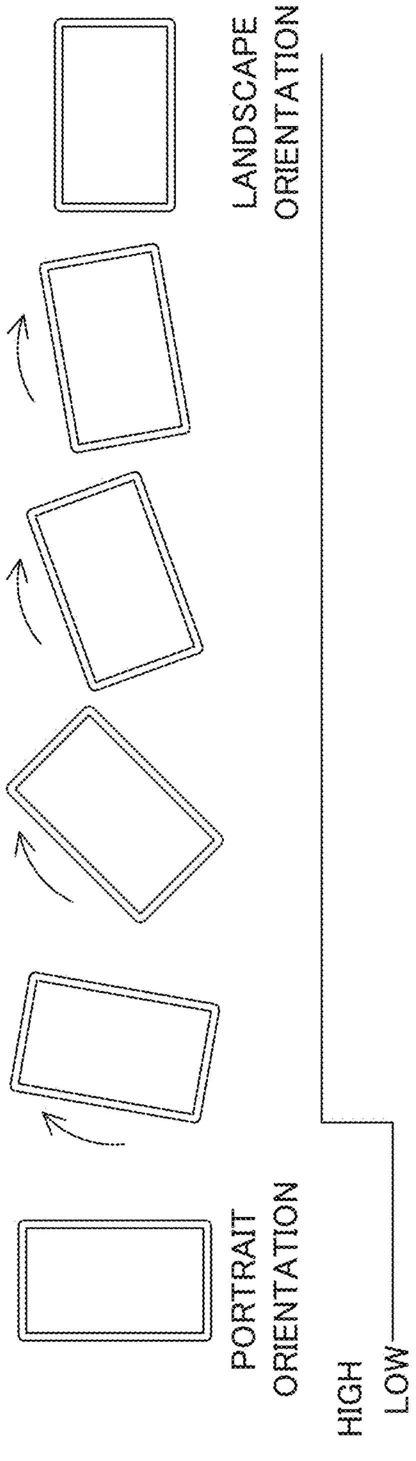

FIGS. 4A and 4B are views for illustrating changes of a signal output from the detection sensor 476 provided at the location responsive to the portrait orientation of the display device 473. As shown in FIGS. 4A and 4B, when the display device 473 is in the portrait orientation (when the switching mechanism is pushed by the cam lobe), the detection sensor 476 provided at the location responsive to the portrait orientation of the display device 473 outputs a Low signal to the control device 10. Otherwise (when the switching mechanism is not pushed by the cam lobe), the detection sensor 476 outputs a High signal to the control device 10.

Therefore, the detection sensor 476 outputs a Low signal to the control device 10 when the display device 473 is in the portrait orientation shown in FIG. 3D, while it outputs a High signal to the control device 10 when the display device 473 is in an orientation other than the portrait orientation shown in FIG. 3D. Thus, a controller 100 to be described hereinafter determines, based on the signal output from the detection sensor 476, whether the display device 473 is in the portrait orientation or in an orientation other than the portrait orientation. Specifically, when the display device 473 is in the portrait orientation shown in FIG. 3D, the controller 100 determines that the display device 473 is in the portrait orientation. When the display device 473 is in any other orientation, the controller 100 determines that the display device 473 is in the landscape orientation.

The network interface device 91 is a communication interface that sends and receives various types of data to and from external devices (for example, personal computers) in a local area network or on the Internet.

The storage device 8 is a large storage device, such as an HDD (hard disk drive) or an SSD (solid state drive), and stores various control programs and others.

The control device 10 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control device 10 includes a controller 100.

When the processor operates in accordance with a control program stored in the storage device 8, the control device 10 functions as the controller 100. However, the controller 100 may not be implemented by the operation of the control device 10 in accordance with the control program but may be constituted by a hardware circuit. Hereinafter, the same applies to the other embodiments unless otherwise stated.

The controller 100 governs the overall operation control of the image forming apparatus 1. The controller 100 is connected to the document feed device 6, the document reading device 5, the image forming device 12, the fixing device 13, the sheet feed device 14, the operation device 47, the network interface device 91, and the storage device 8 and controls the operations of these components. For example, the controller 100 performs various types of processing necessary for image formation of the image forming apparatus 1.

Furthermore, the controller 100 controls the display of the display device 473. For example, the controller 100 allows the display device 473 to display as a "home screen" an operation screen SC1 shown as an example in FIG. 5. In the operation screen SC1, operating keys K1 to K7 called "application icons" or so on are arranged. For example, the operating key K4 is an icon in which a character string "Copy" is written and an illustration of "Copy" is represented. Furthermore, in the operation screen SC1, operating keys K11 to K16 called "task icons" or so on are arranged at the top and operating keys K21 and K23 are arranged at the right end.

The controller 100 performs control based on an instruction accepted by the operation device 47. For example, when the operation device 47 accepts through the touch panel an instruction based on an operation on the operating key K4, the controller 100 controls the display of the display device 474 according to the instruction to allow the screen displayed on the display device 473 to transition from the "home screen" to a "copy screen" shown as an example in FIG. 6A.

Figure 6A:
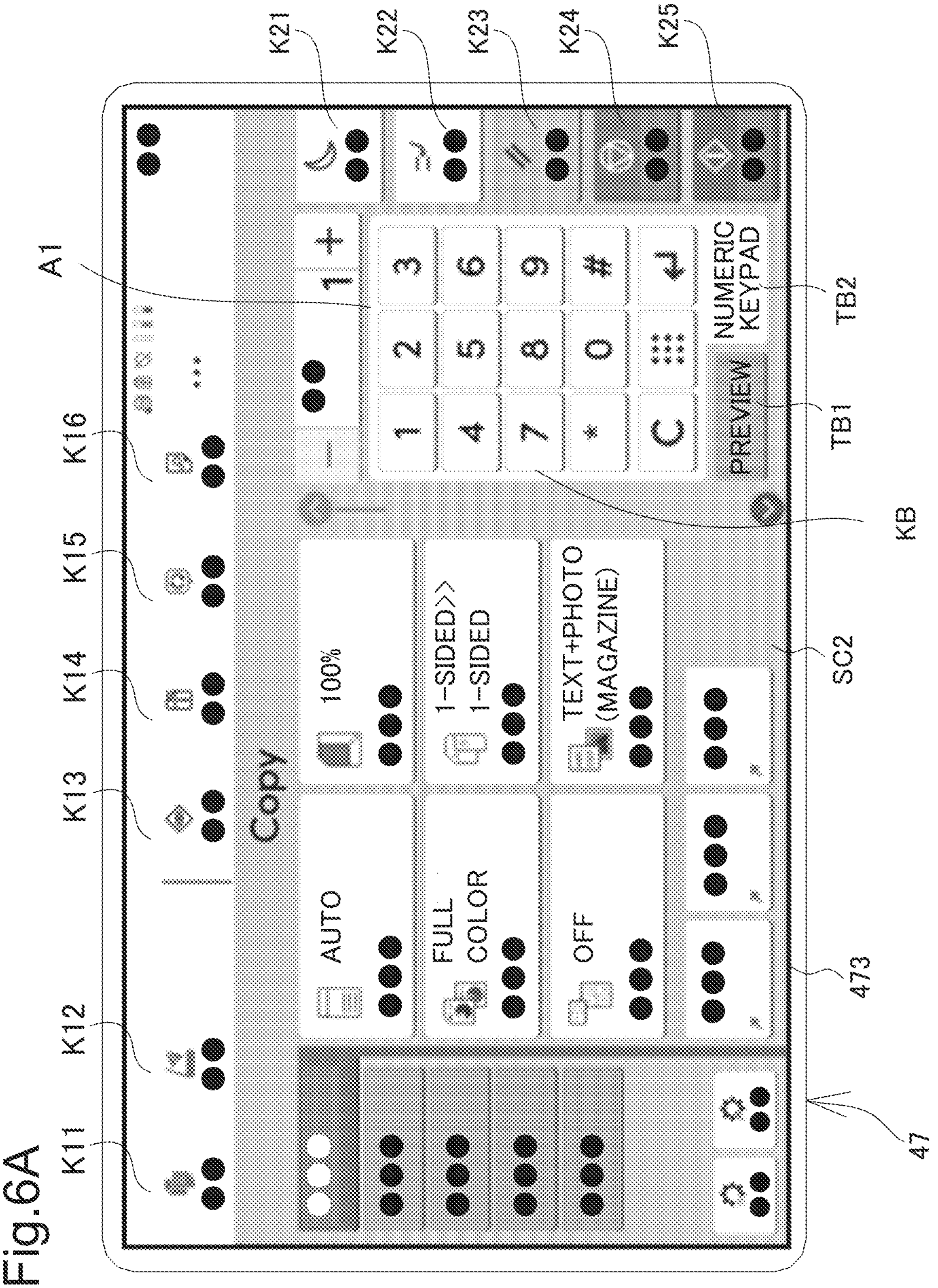
FIG. 6A is a view showing another example of a screen displayed on the display device.

In the operation screen SC2 shown in FIG. 6A, like the operation screen SC1, the operating keys K11 to K16 are arranged at the top thereof. Furthermore, at the right end of the operation screen SC2, not only the operating keys K21 and K23, but also operating keys K22, K24, and K25 are arranged. The operating key K25 is an icon in which a character string "Start" is written.

The operation screen SC2 shown in FIG. 6A contains a numeric keypad display area A1 where a numeric keypad KB is displayed. Tabs TB1 and TB2 are displayed on the operation screen SC2. The tab TB1 is a tab image through which an instruction to display a preview is accepted. The tab TB2 is a tab image through which an instruction to display a numeric keypad is accepted.

Figure 6B:
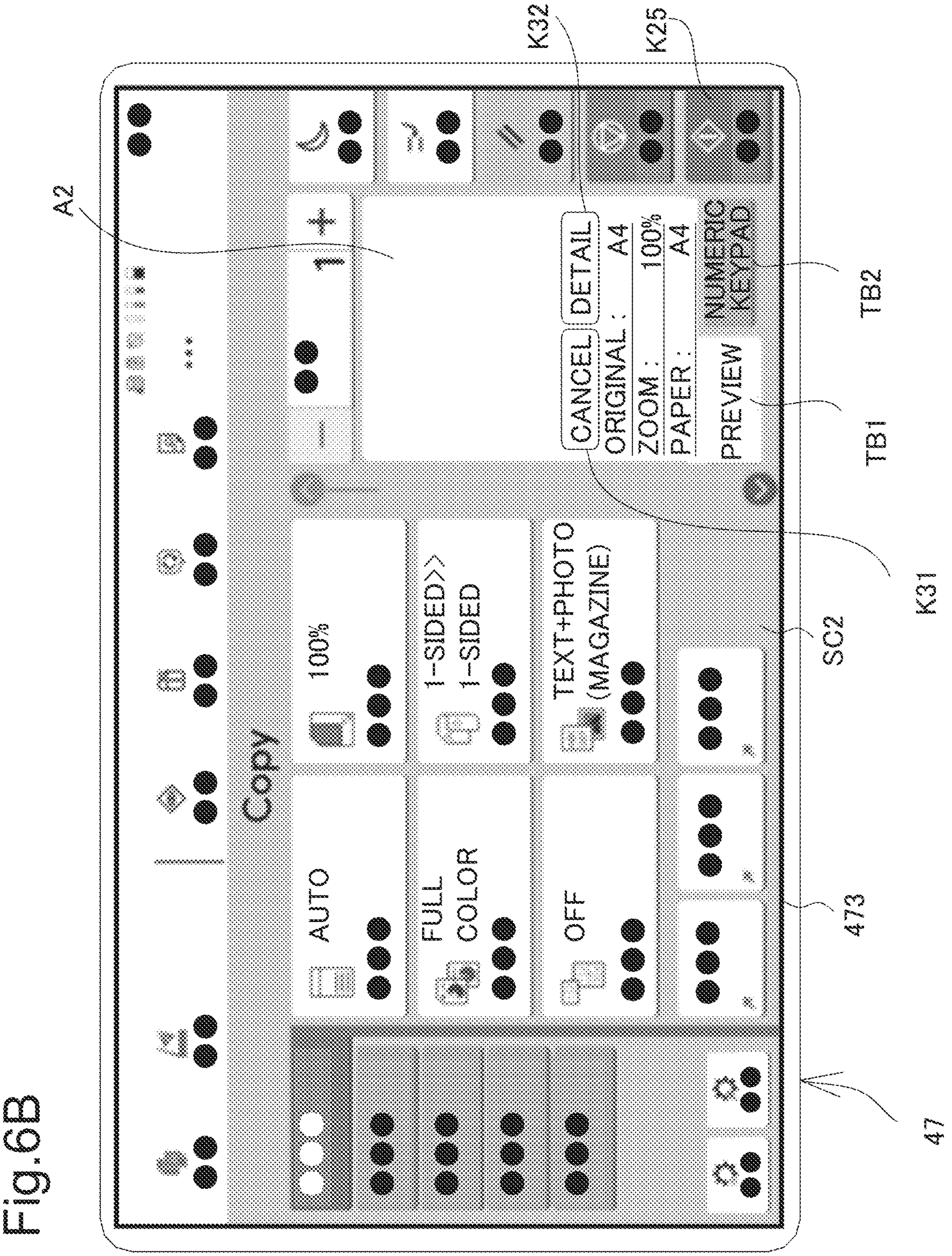
FIG. 6B is a view showing another example of a screen displayed on the display device.

When the operation device 47 accepts through the touch panel an instruction based on an operation on the tab TB1 during display of the operation screen SC2 shown in FIG. 6A, the controller 100 follows the instruction and thus allows a preview display area A2 to be displayed on the operation screen SC2 (see FIG. 6B). The preview display area A2 is an area where a preview PV1 of a printed matter that will be obtained by image formation of the image forming device 12 is displayed.

The switching between the above display areas is performed by the controller 100 according to instructions based on operations on the tabs TB1 and TB2. When the operation device 47 accepts through the touch panel an instruction based on an operation on the tab TB2 bearing a character string "Numeric Keypad", the controller 100, as shown in FIG. 6A, allows the numeric keypad display area A1 to be displayed within the operation screen SC2 and allows the numeric key pad KB to be displayed in the numeric keypad display area A1.

Figure 6C:
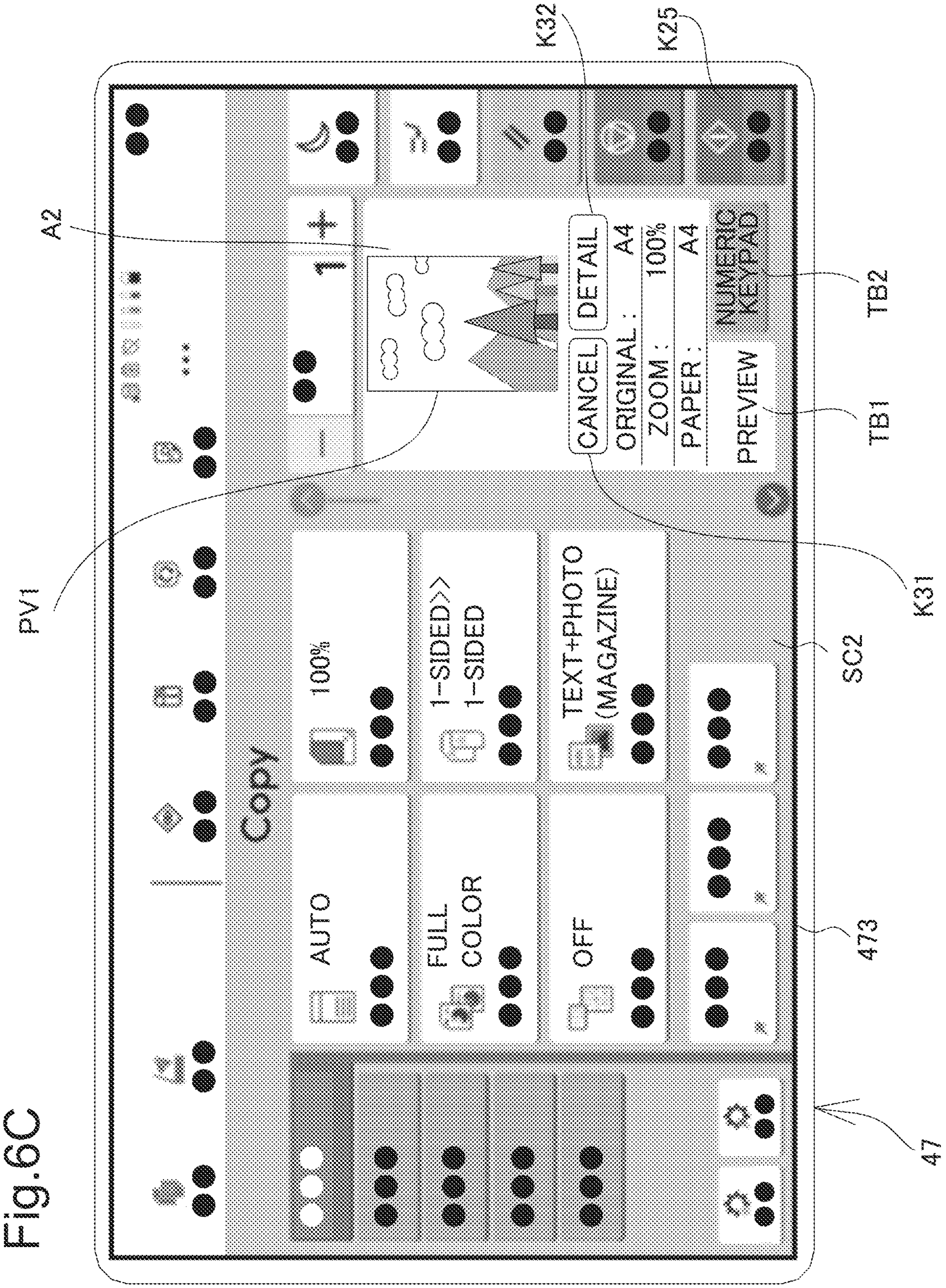
FIG. 6C is a view showing another example of a screen displayed on the display device.

When the operation device 47 accepts an instruction based on an operation on the operating key K25 located in the operation screen SC2 and bearing a character string "Start" while the preview display area A2 is displayed within the operation screen SC2 (see FIG. 6B), the controller 100 allows a copy operation to be started and thus allows the document reading device 5 to read an original document present in the document feed device 6 or on a flatbed. Then, as shown in FIG. 6C, the controller 100 allows a preview PV1 of an image obtained by image reading to be displayed in the preview display area A2 to make the top and bottom edges of the image parallel to the longer sides of the display device 473 (see FIG. 6C). In this state before an image is formed on a recording paper sheet after an original document is read, the controller 100 temporarily stops the copy operation.

The method for displaying a preview and the timing with which an original document is read are not limited to the above and can be changed. For example, when an instruction to execute a copy operation is accepted by the operation device 47, the controller 100 may allow the document feed device 6 and the document reading device 5 to read an original document, then temporarily stop the copy operation, put the image forming operation on hold, and at this point in time allow the operation screen SC2 shown in FIG. 6A to be still displayed. Thereafter, when the operation device 47 accepts an instruction based on an operation on the tab TB1, the controller 100 may allow the preview display area A2 and the preview PV1 to be displayed on the operation screen SC2.

The operation screen SC2 shown in FIG. 6C includes: an operating key K31 in which a character string "Cancel" is written and through which a cancel instruction for cancelling the image formation based on image data associated with the preview PV1 is accepted; and an operating key K32 in which a character string "Detail" is written and through which a detailing instruction for displaying details of the preview PV1 is accepted.

When the operation device 47 accepts an instruction based on an operation on the operating key K31, the controller 100 cancels the already started copy operation and keeps a later scheduled operation for forming an image on a recording paper sheet from being performed. At this time, the controller 100 deletes image data obtained by reading of original documents from the above-described image memory or the like and hides the preview PV1 from view on the operation screen SC2.

Figure 7:
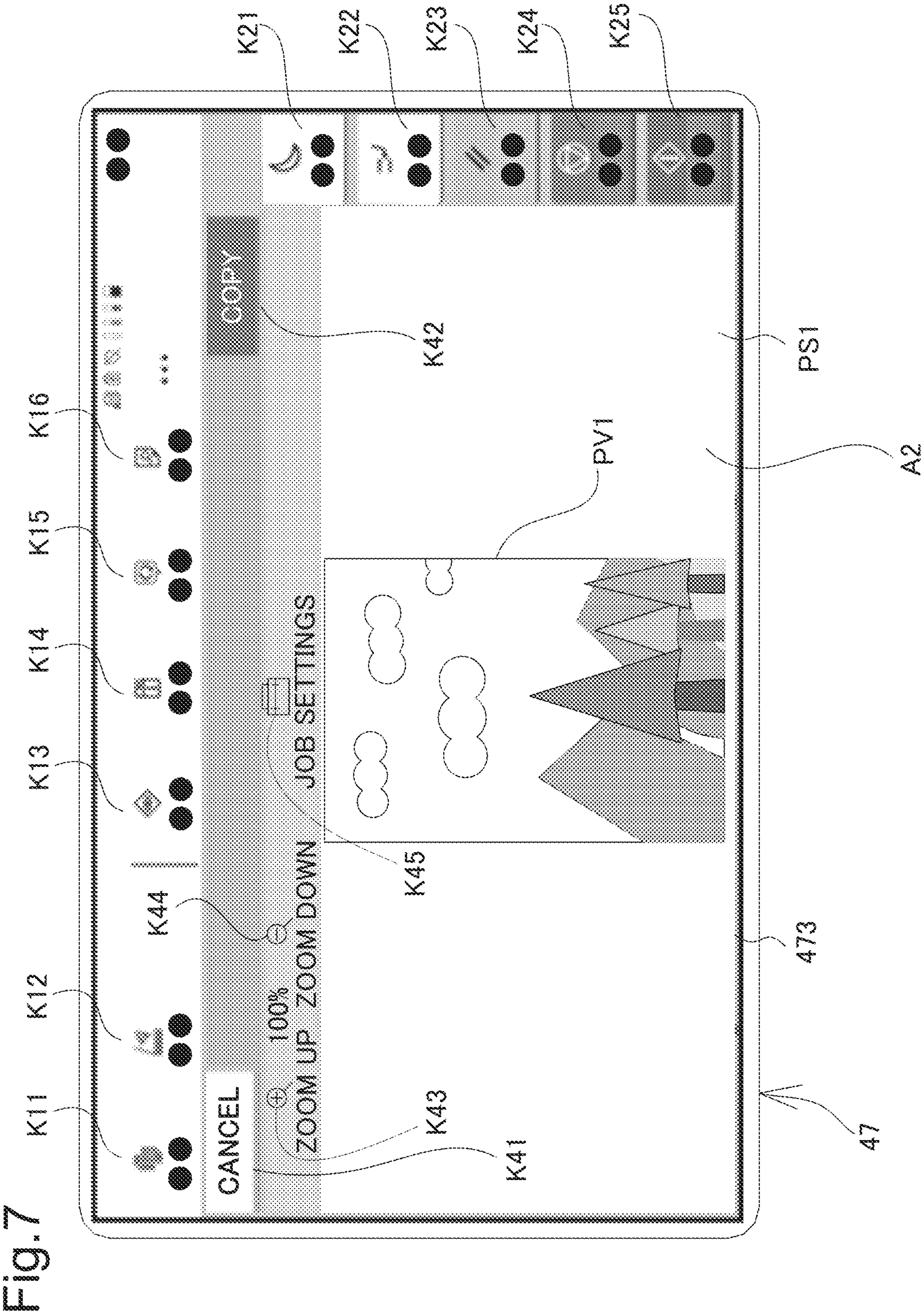
FIG. 7 is a view showing another example of a screen displayed on the display device.

On the other hand, when the operation device 47 accepts a detailing instruction based on an operation on the operating key K32, the controller 100, as shown as an example in FIG. 7, enlarges the preview display area A2 to change it to a first enlarged size ES1 and allows the preview PV1 to be displayed in a size enlarged to fit the preview display area A2 enlarged to the first enlarged size ES1. Therefore, the instruction based on an operation on the operating key K32 bearing a character string "Detail" is also an instruction to enlarge the preview PV1.

In a first preview screen PS1 shown in FIG. 7, like the operation screen SC2, the operating keys K11 to K16 are arranged at the top and the operating keys K21 to K25 are arranged at the right end. Furthermore, the first preview screen PS1 includes: an operating key K42 in which a character string "Cancel" is written and through which a cancel instruction for cancelling image formation (a job) based on image data associated with the preview PV1 is accepted; an operating key K42 in which a character string "Copy" is written; an operating key K43 which is represented by an illustration of a magnifying glass with a plus sign enclosed therein and through which an enlargement instruction to enlarge the preview PV1 is accepted; an operating key K44 which is represented by an illustration of a magnifying glass with a minus sign enclosed therein and through which a reduction instruction to reduce the size of the preview PV1 is accepted; and an operating key K45 through which a change instruction to change the settings of the job is accepted.

Character strings "Zoom up", "Zoom down", and "Job settings" are displayed just under the operating keys K43, K44, and K45, respectively, and a character string "100%" indicating the display magnification of the preview is displayed between the operating key K43 and the operating key K44.

When the operation device 47 accepts an instruction based on an operation on the operating key K43 or a pinch-out gesture within the preview display area A2, the controller 100 allows the preview PV1 to be displayed in an enlarged size. When the operation device 47 accepts an instruction based on an operation on the operating key K44 or a pinch-in gesture within the preview display area A2, the controller 100 allows the preview PV1 to be displayed in a reduced size.

When the operation device 47 accepts an instruction based on an operation on the operating key K41 bearing a character string "Cancel" during display of the first preview screen PS1, the controller 100 cancels the already started copy operation and keeps a later scheduled operation for forming an image on a recording paper sheet from being performed. Furthermore, when the operation device 47 accepts, based on a user's operation, an instruction to execute image formation associated with the operating key K42 bearing a character string "Copy" or an instruction to execute image formation associated with the operating key K25, the controller 100 allows the image forming device 12 to perform image formation based on image data obtained by reading of original documents.

Suppose that the preview PV1 is displayed in the preview display area A2 enlarged to the first enlarged size ES1 (for example, the first preview screen PS1 shown in FIG. 7 is displayed on the display device 473) and the controller 100 determines, based on a signal output from the detection sensor 476, that the display device 473 is in an orientation other than the portrait orientation (i.e., in the landscape orientation). In this state, when the controller 100 detects, based on the detection by the detection sensor 476, that the display device 473 has switched from the landscape orientation to the portrait orientation, the controller 100, as shown as an example in FIG. 8, further enlarges the preview display area A2 to change it to a second enlarged size ES2 and allows the preview PV1 to be displayed in a size enlarged to fit the preview display area A2 enlarged to the second enlarged size ES2 and displayed to make the top and bottom edges Ed1, Ed2 of the preview PV1 parallel to the shorter sides Ds1, Ds2 of the display device 473. The second enlarged size ES2 has a predetermined area larger than the first enlarged size ES1 while keeping the aspect ratio of the first enlarged size ES1.

When, in this manner, the user manually rotates the display device 473 from the landscape orientation to the portrait orientation while the first preview screen PS1 (see FIG. 7) is displayed on the display device 473, the controller 100 allows the screen displayed on the display device 473 to transition from the first preview screen PS1 to a second preview screen PS2 (see FIG. 8), thus displaying the preview PV1 in a further enlarged size.

Figure 9:
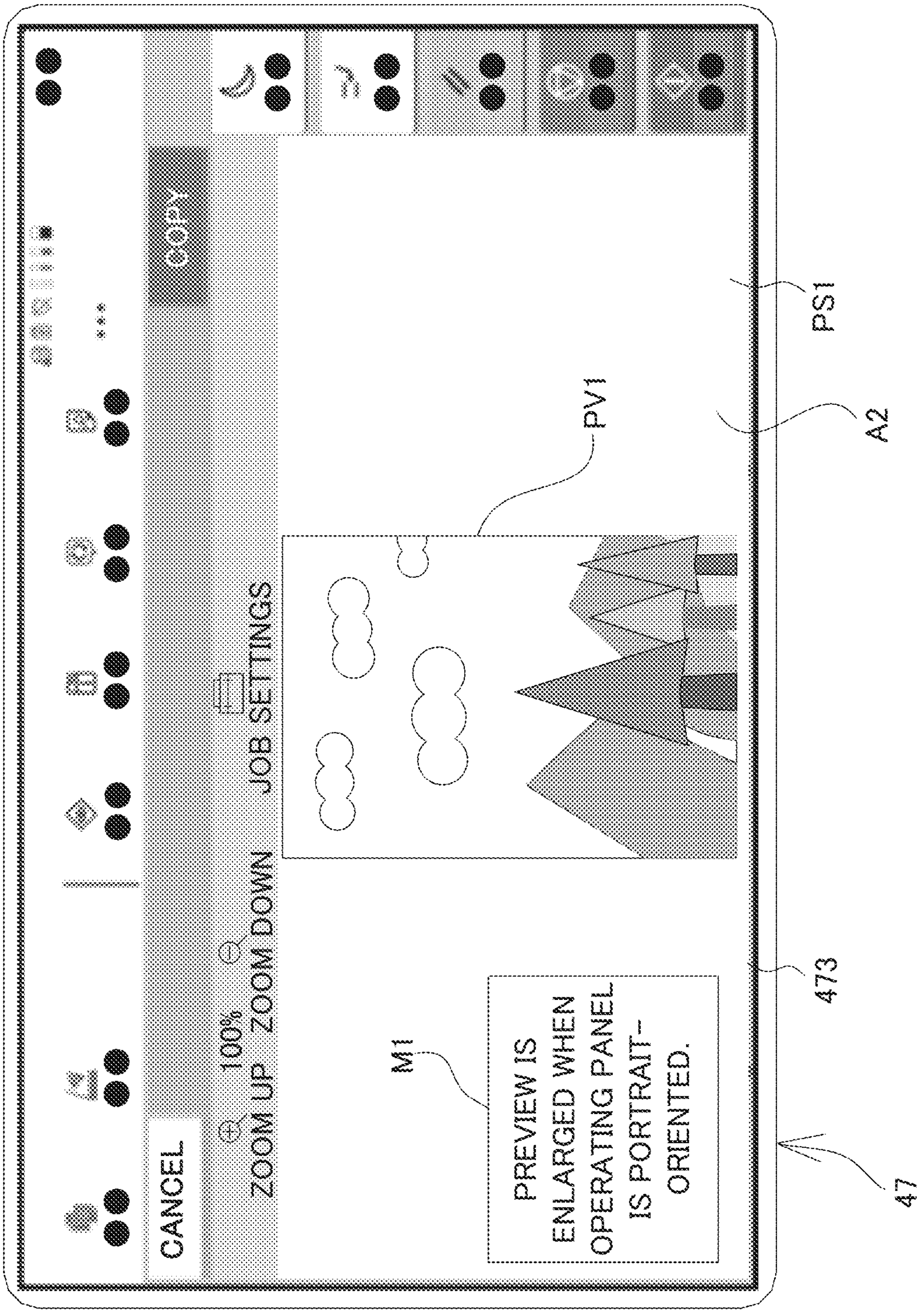
FIG. 9 is a view showing another example of a screen displayed on the display device.

The user may be notified in advance of this screen transition during the display of the first preview screen PS1. For example, as shown as an example in FIG. 9, the controller 100 allows a message M1 "Preview is Enlarged When Operating Panel is Portrait-Oriented." indicating the above screen transition to be displayed on the first preview screen PS1.

Figure 8:
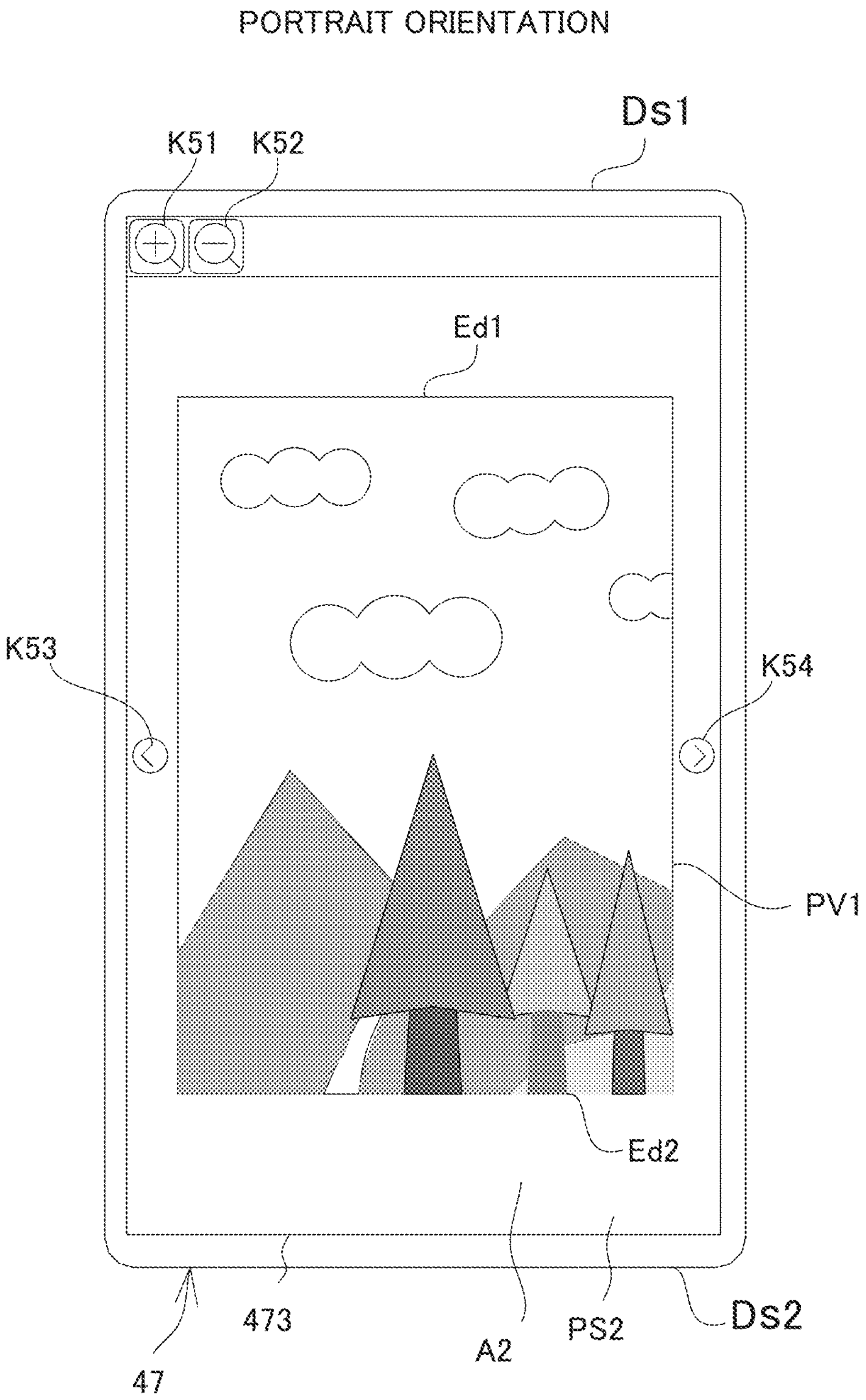
FIG. 8 is a view showing another example of a screen displayed on the display device.

At the top of the second preview screen PS2 shown in FIG. 8, an operating key K51 which is represented by an illustration of a magnifying glass with a plus sign enclosed therein and through which an enlargement instruction to enlarge the preview PV1 is accepted, and an operating key K52 which is represented by an illustration of a magnifying glass with a minus sign enclosed therein and through which a reduction instruction to reduce the size of the preview PV1 is accepted are arranged. Furthermore, in the second preview screen PS2, an operating key K53 which is represented by a "leftward arrow" and through which a page-up instruction to move up the page is accepted is arranged at the left end, and an operating key K54 which is represented by a "rightward arrow" and through which a page-down instruction to move down the page is accepted is arranged at the right end. The operating keys K51 to K54 are icons using image data. The operating keys K51 to K54 are operating keys related to the display of the preview PV1.

Figure 5:
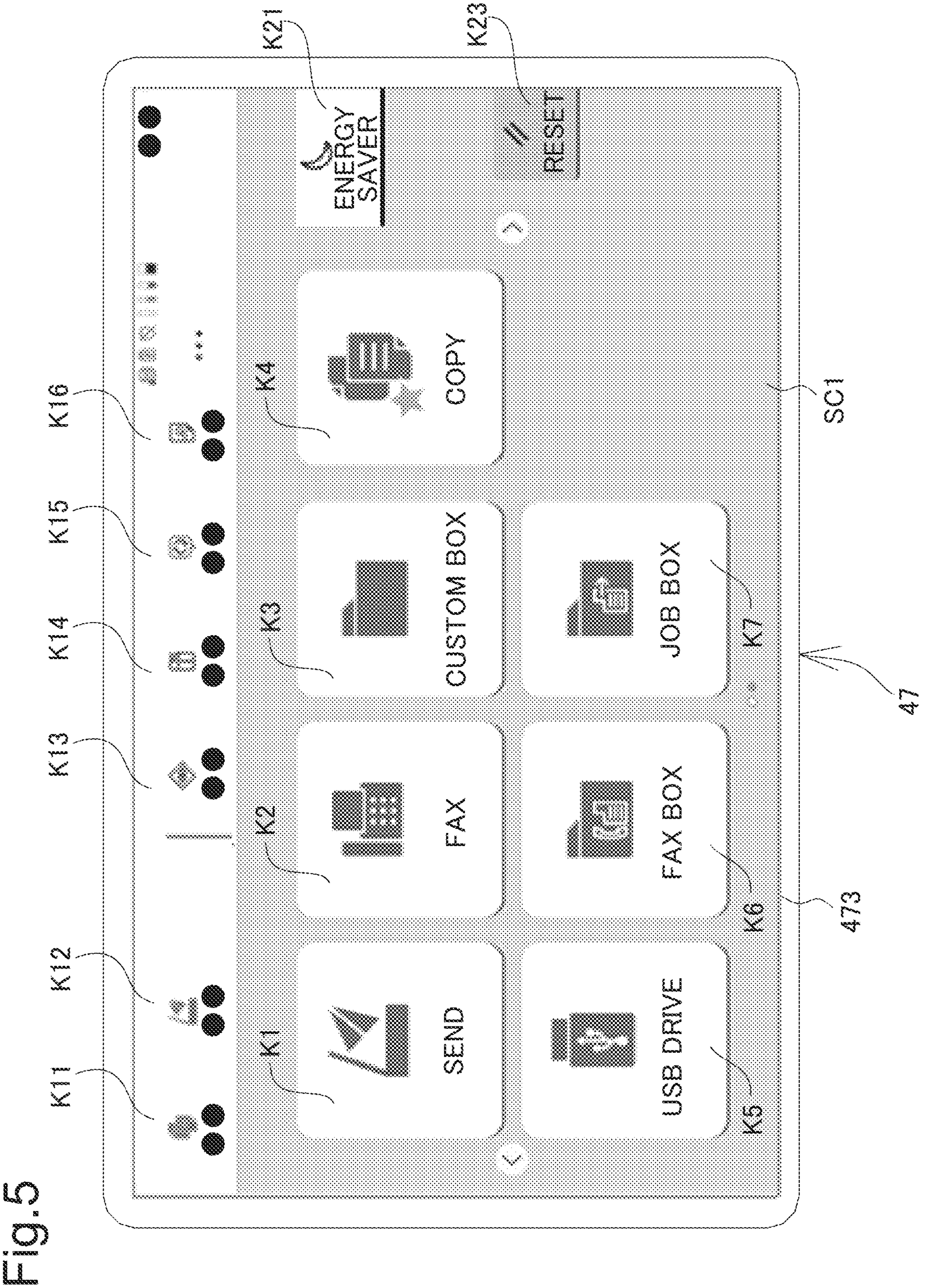
FIG. 5 is a view showing an example of a screen displayed on the display device.

As shown in FIGS. 5 to 7, the controller 100 allows the display device 473 to display, on the operation screens SC1, SC2 and the first preview screen PS1, a display screen where the operating keys K11 to K16 are arranged at the top and the operating keys K21 to K25 or so on are arranged at the right end. On the other hand, on the second preview screen PS2 shown in FIG. 8, the controller 100 hides the operating keys unrelated to the input of instructions involved in the display of a preview and enlarges the preview display area A2 for the preview to an area where the unrelated operating keys are hidden. Here, the operating keys unrelated to the input of instructions involved in the display of a preview are, for example, keys through which any instruction involved in the display of a preview is not accepted or operating keys K24, K25 through which instructions related to the image forming operation itself are accepted.

Thus, the preview display area A2 can be further enlarged within a range where an image can be displayed on the display device 473, and, therefore, the preview PV1 can be displayed on a larger scale.

Furthermore, in this embodiment, when the display device 473 switches from the landscape orientation to the portrait orientation while the first preview screen PS1 (see FIG. 7) is displayed on the display device 473, the controller 100 allows the screen displayed on the display device 473 to transition from the first preview screen PS1 to the second preview screen PS2 (see FIG. 8). On the other hand, even when the display device 473 switches from the landscape orientation to the portrait orientation while the operation screen SC2 (see FIG. 6B) is displayed on the display device 473, the controller 100 does not allow the transition of the screen displayed on the display device 473. Therefore, in this case, the controller 100 allows the display device 473 to display a screen shown as an example in FIG. 10.

Figure 10:
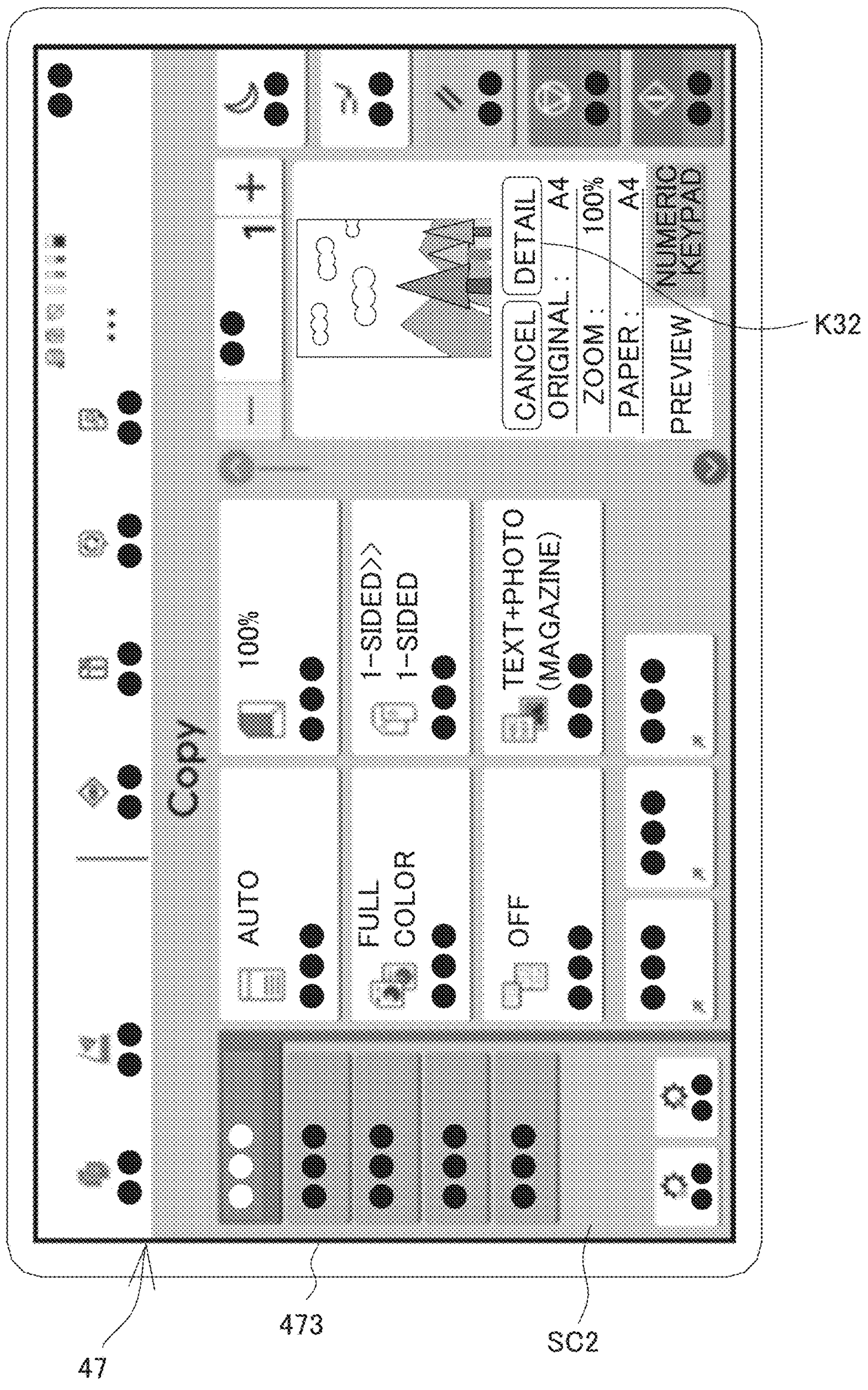
FIG. 10 is a view showing another example of a screen displayed on the display device.

When, in the state where the detection sensor 476 has detected the portrait orientation of the display device 473 and the controller 100 allows the display device 473 to display the operation screen SC2 (the state of the display device 473 as shown in FIG. 10), the operation device 47 accepts an instruction to enlarge the preview PV1, i.e., an instruction based on an operation on the operating key K32 located in the operation screen SC2 and bearing a character string "Detail", the controller 100 enlarges the preview display area A2 to change it to the second enlarged size ES2 and allows the preview PV1 to be displayed in a size enlarged to fit the preview display area A2 enlarged to the second enlarged size ES2 and displayed to make the top and bottom edges of the preview PV1 parallel to the shorter sides of the display device 473. In other words, the controller 100 allows the display screen of the display device 473 to transition from the operation screen SC2 (see FIG. 10) to the second preview screen PS2 (see FIG. 8) not through the display of the first preview screen PS1 (see FIG. 7).

Figure 11:
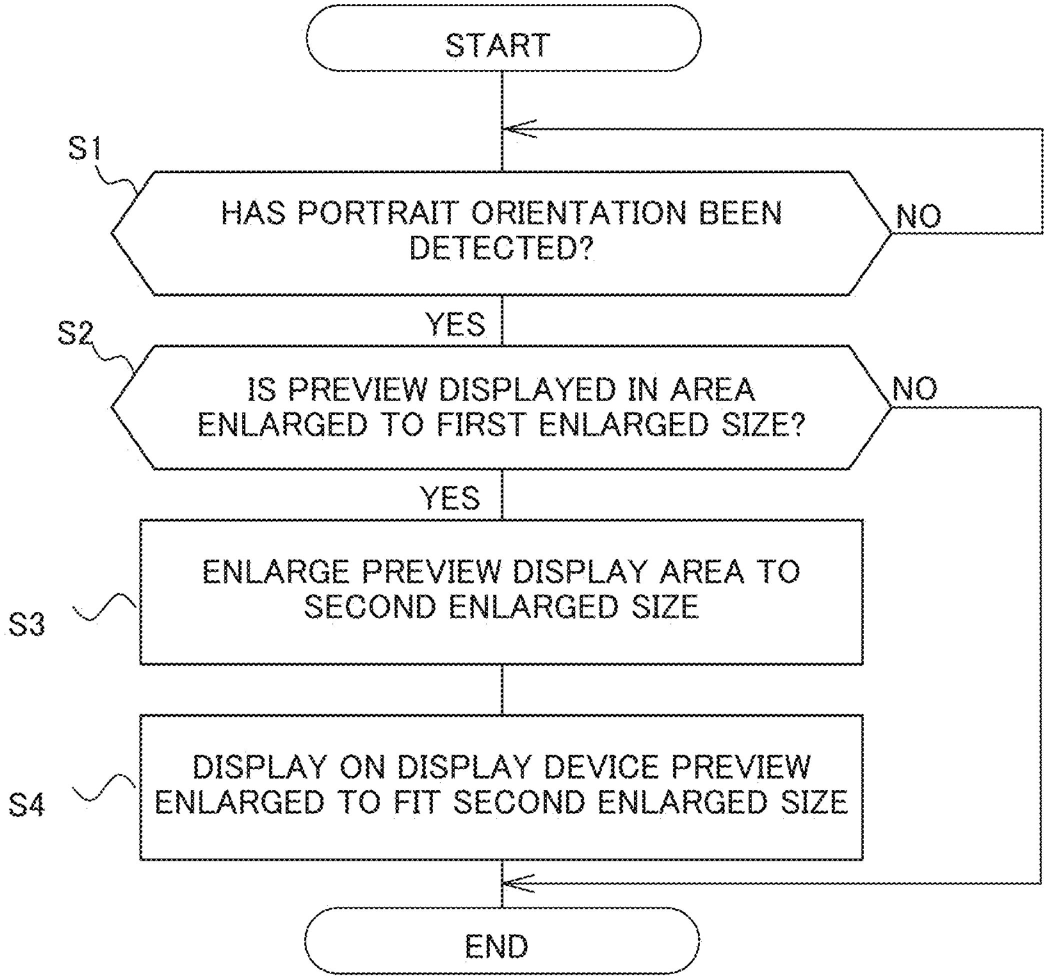
FIG. 11 is a flowchart showing a first embodiment of processing for display control of a controller upon change in orientation of the display device.

Next, a description will be given of a first embodiment of processing for display control of the controller 100 upon change in orientation of the display device 473 with reference to the flowchart shown in FIG. 11.

The controller 100 determines whether the detection sensor 476 has detected switching of the display device 473 from the landscape orientation to the portrait orientation (i.e., whether the signal output from the detection sensor 476 to the control device 10 has switched from a High signal to a Low signal) (S1).

When determining that the detection sensor 476 has detected switching of the display device 473 from the landscape orientation to the portrait orientation (YES in S1), the controller 100 determines whether, according to the above detailing instruction from the user, the first preview screen PS1 as shown in FIG. 7 is displayed on the display device 473, i.e., whether the preview PV1 is displayed in the preview display area A2 enlarged to the first enlarged size ES1 (S2).

When determining that the preview PV1 is displayed in the preview display area A2 enlarged to the first enlarged size ES1 (YES in S2), the controller 100 enlarges the preview display area A2 to change it to the second enlarged size ES2 (S3). In addition, the controller 100 allows the preview PV1 to be displayed in a size enlarged to fit the preview display area A2 enlarged to the second enlarged size ES2 and displayed to make the top and bottom edges of the preview PV1 parallel to the shorter sides of the display device 473 (S4). For example, the controller 100 allows the screen displayed on the display device 473 to transition from the first preview screen PS1 (see FIG. 7) to the second preview screen PS2 (see FIG. 8). Then, the processing ends.

On the other hand, when the controller 100 determines that the detection sensor 476 has detected switching of the display device 473 from the landscape orientation to the portrait orientation (YES in S1) and further determines that the preview PV1 is not displayed in the preview display area A2 enlarged to the first enlarged size (NO in S2), the controller 100 does not execute the processing in S3 and S4. In other words, the controller 100 keeps the current display screen displayed as it is. For example, the orientation and display screen of the display device 473 are as shown in FIG. 10. Then, the processing ends.

Figure 12:
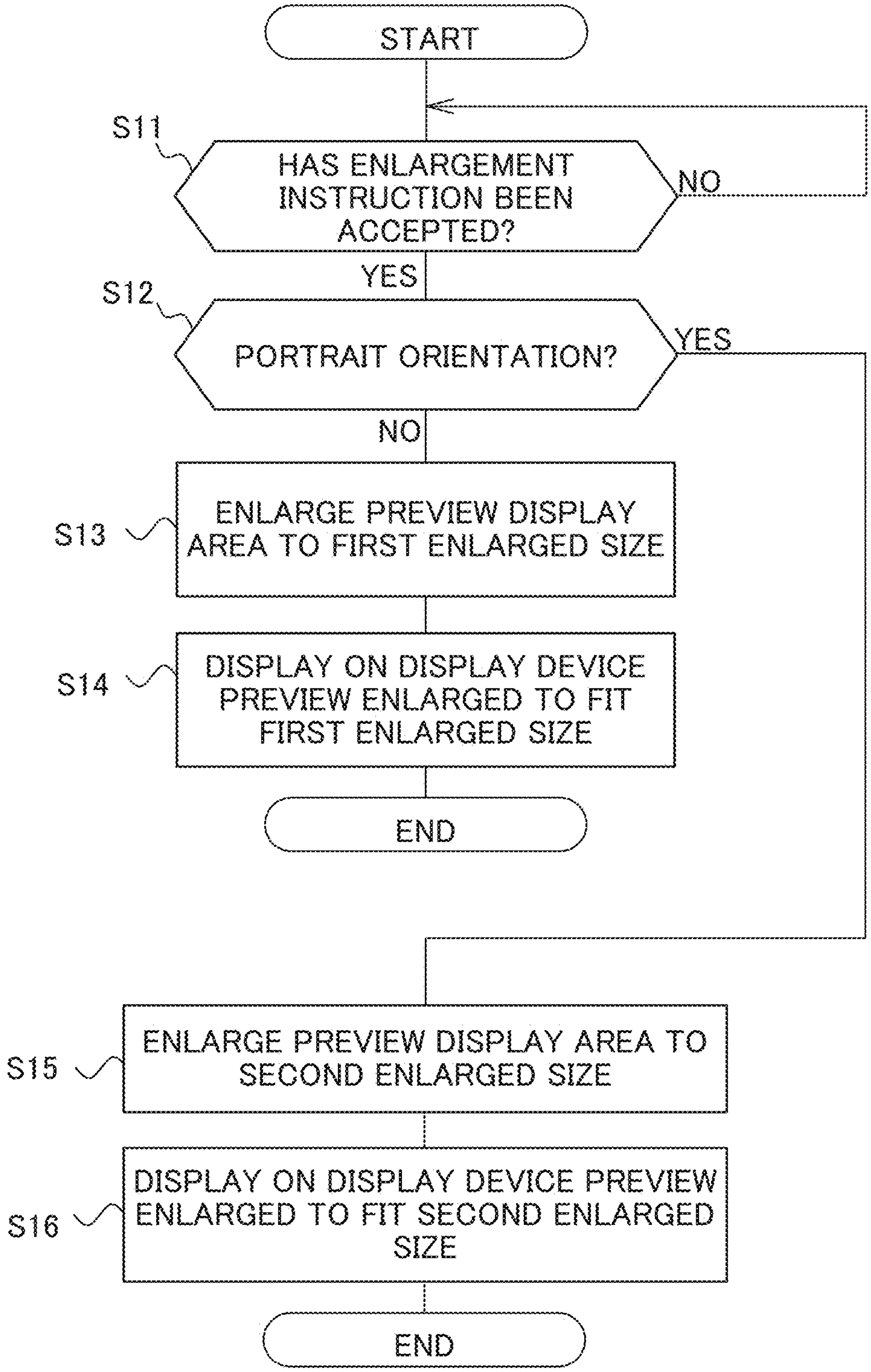
FIG. 12 is a flowchart showing a second embodiment of processing for display control of the controller upon change in orientation of the display device.

Next, a description will be given of a second embodiment of processing for display control of the controller 100 upon change in orientation of the display device 473 with reference to the flowchart shown in FIG. 12.

The controller 100 determines whether the operation device 47 has accepted an enlargement instruction, for example, associated with the operating key K32 in the operation screen SC2 (see FIGS. 6C and 10) (i.e., an instruction to enlarge the preview PV1) (S11).

When determining that the operation device 47 has accepted the enlargement instruction (YES in S11), the controller 100 determines, based on a signal from the detection sensor 476, whether the display device 473 is in the portrait orientation (S12). When determining that the display device 473 is in the landscape orientation (not in the portrait orientation) (NO in S12), the controller 100 enlarges the preview display area A2 to change it to the first enlarged size ES1 (S13) and allows the preview PV1 to be displayed in a size enlarged to fit the preview display area A2 enlarged to the first enlarged size ES1 (S14). Then, this processing ends. For example, the controller 100 allows the screen displayed on the display device 473 to transition from the operation screen SC2 (see FIG. 6C) to the first preview screen PS1 (see FIG. 7).

On the other hand, when determining that the operation device 47 has accepted the enlargement instruction (YES in S11) and further determines, based on a signal from the detection sensor 476, that the display device 473 is in the portrait orientation (YES in S12), the controller 100 enlarges the preview display area A2 to change it to the second enlarged size ES2 (S15) and allows the preview PV1 to be displayed in a size enlarged to fit the preview display area A2 enlarged to the second enlarged size ES2 and displayed to make the top and bottom edges of the preview PV1 parallel to the shorter sides of the display device 473 (S16). For example, the controller 100 allows the screen displayed on the display device 473 to transition from the operation screen SC2 (see FIG. 10) to the second preview screen PS2 (see FIG. 8). Then, the processing ends.

As thus far described, in the above embodiments, when the display device 473 switches from the landscape orientation to the portrait orientation, the second preview screen PS2 as shown in FIG. 8 is displayed on the display device 473 to enlarge the preview PV1 and, thus, the user can easily check the contents of the preview PV1 in detail. Particularly, a vertically long preview can be displayed efficiently on a large scale within the preview display area enlarged in the above manner. Thus, for example, it is possible that the characters in the preview PV1 is displayed in a size enlarged to the extent that the user can recognize them.

When, in a state where the display device 473 is in the landscape orientation and the operation screen SC2 (see FIG. 6C) is displayed on the display device 473, the user switches the orientation of the display device 473 from the landscape orientation to the portrait orientation and the controller 100 determines, based on a signal from the detection sensor 476, that the display device 473 is in the portrait orientation, the controller 100 prevents the screen displayed on the display device 473 from transitioning to the second preview screen PS2 (see FIG. 8) and keeps the operation screen SC2 displayed as it is (see FIG. 10). The reason for the control just described is that even if the screen displayed on the display device 473 is suddenly switched from the operation screen SC2 to the second preview screen PS2 based only on a user's action of switching of the display device 473 from the landscape orientation to the portrait orientation, this user's action has no connection with the display screen (the second preview screen PS2) switched based on the action and, therefore, the user may be confused when viewing the switched display screen.

Figure 13A:
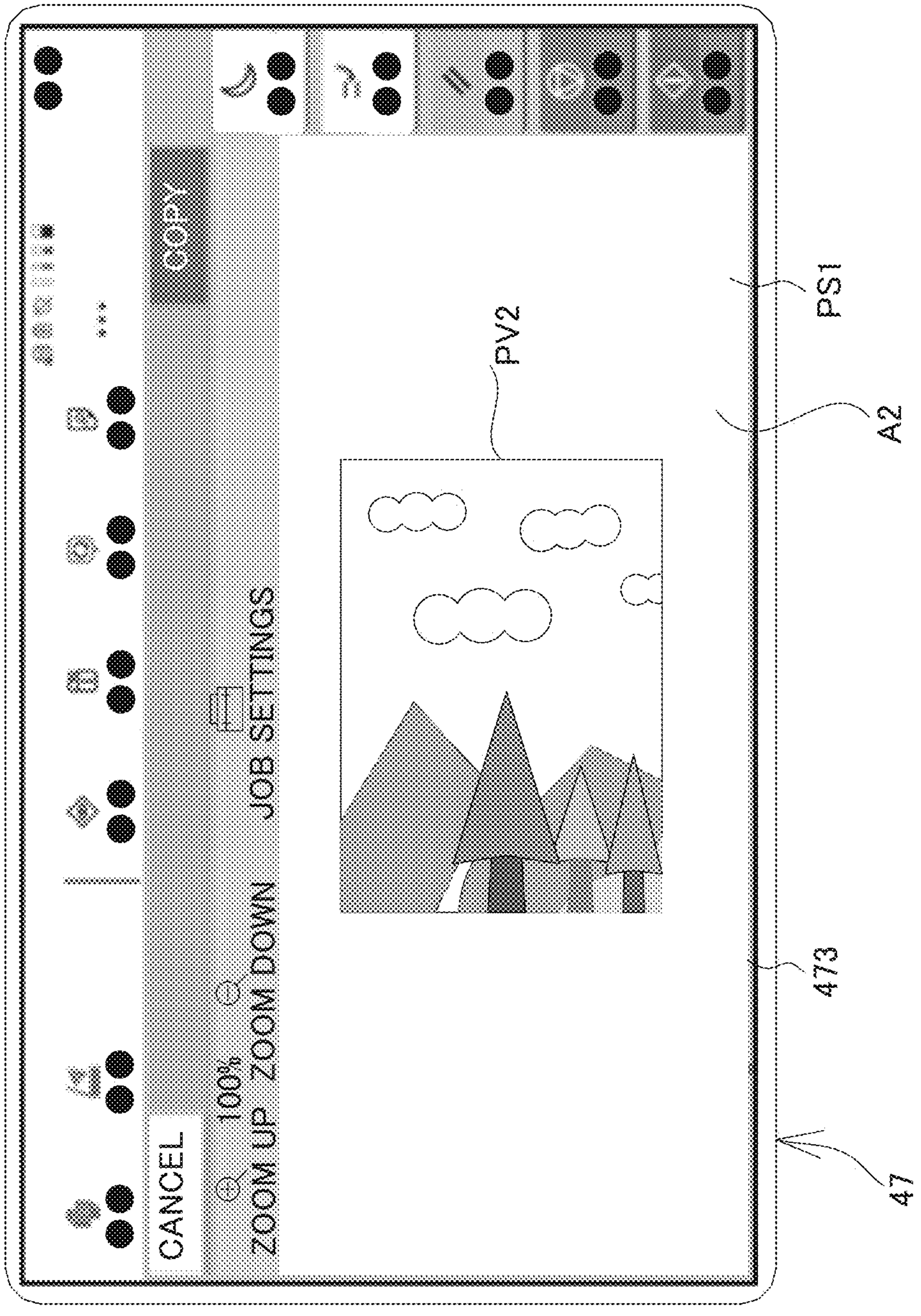
FIGS. 13A and 13B are views showing other examples of a screen displayed on the display device.
Figure 13B:
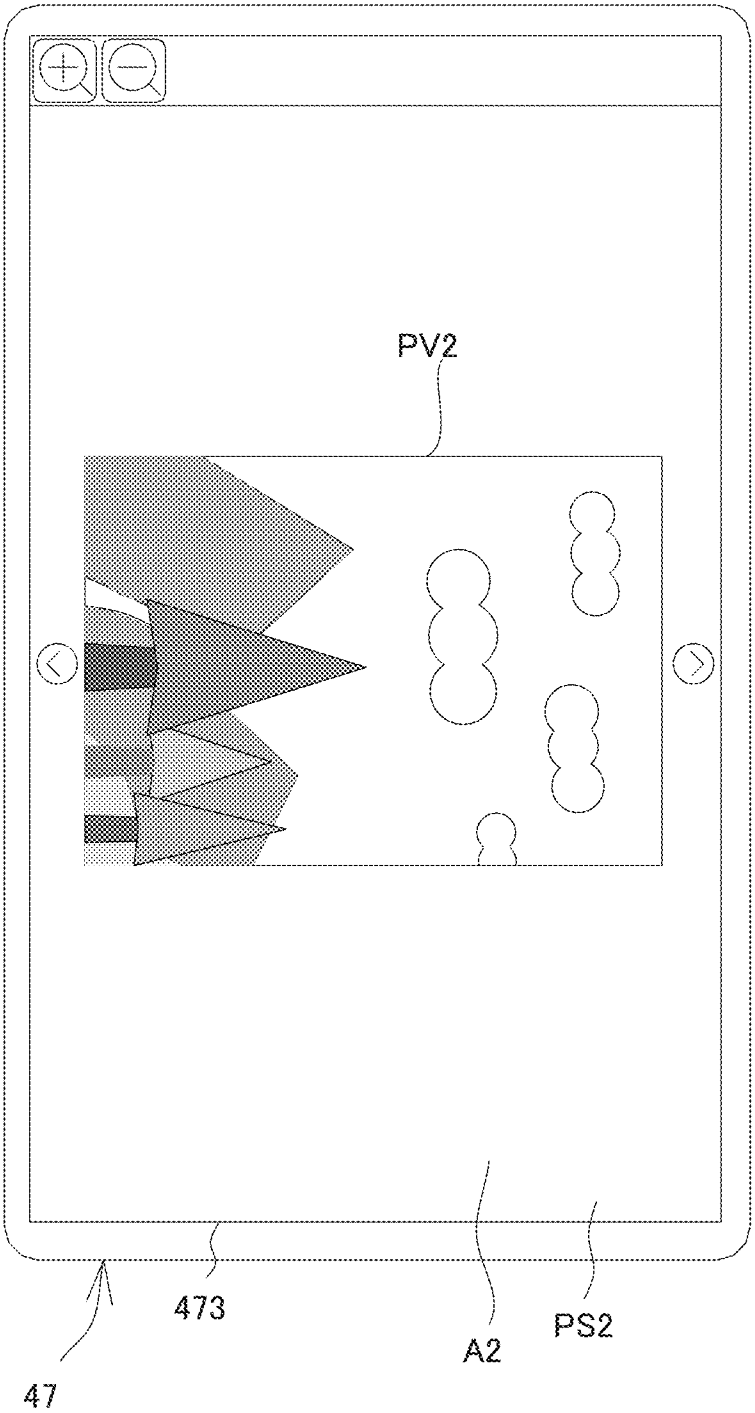

Although in the above embodiments the display control of the controller 100 upon change in orientation of the display device 473 is described using the case where a portrait-oriented preview PV1 is displayed in the preview display area A2, the same control is also performed when a landscape-oriented preview is displayed in the preview display area A2. In the processing shown by the flowchart of FIG. 11, when determining that a landscape-oriented (horizontally long) preview PV2 shown as an example in FIG. 13A is displayed in the preview display area A2 enlarged to the first enlarged size ES1 (YES in S2 in the flowchart of FIG. 11), the controller 100 enlarges the preview display area A2 to change it to the second enlarged size ES2 (S3). Furthermore, the controller 100 allows the preview PV2 to be displayed in a size enlarged to fit the preview display area A2 enlarged to the second enlarged size ES2 and displayed to make the top and bottom edges of the preview PV2 parallel to the shorter sides of the display device 473 (S4). For example, the controller 100 allows the screen displayed on the display device 473 to transition from the first preview screen PS1 (see FIG. 13A) to the second preview screen PS2 (see FIG. 13B).

An information processing apparatus according to one embodiment of the present disclosure is, for example, a personal computer or the like and at least includes an operation device 47, a display device 473, a rotation mechanism 474, a detection sensor 476, and a controller 100. In the information processing apparatus according to the one embodiment of the present disclosure, an image forming device 12 is not an essential component. Also in the information processing apparatus according to the one embodiment of the present disclosure, in the case where the controller 100 allows the display device 473 to display image data stored, for example, in a built-in memory or HDD, the controller 100 performs the above-described display control upon change in orientation of the display device 473. In this case, needless to say, the above-described processing for image formation is not executed.

Furthermore, also when, in the image forming apparatus 1, the storage device 8 includes a document box as its storage area and image data to be displayed on the display device 473 is stored in the document box, the controller 100 performs the above-described display control upon change in orientation of the display device 473 while allowing the display device 473 to display the image data.

When, in a general image forming apparatus not according to the above embodiments, its display device is in a landscape orientation and the display screen is horizontally long, even though the image forming apparatus has a preview function to display a finished image of a printed matter as a preview on the display device, the preview cannot sufficiently be enlarged vertically and, thus, a vertically long preview cannot be displayed on a sufficiently large scale. Therefore, in such an image forming apparatus, there arises a problem that character images contained in the preview cannot be enlarged to a size that the user can easily recognize them, and the user has difficulty in checking the finished image of the printed matter in detail.

Unlike the above general image forming apparatus, in the above embodiments, the user can easily check the contents of the preview in detail. Particularly, a vertically long preview can be displayed efficiently on a large scale within the preview display area enlarged in the manner described previously.

The present disclosure is not limited to the above embodiments and can be modified in various ways. The structures, configurations, and processing of the above embodiments described with reference to FIGS. 1 to 13 are merely illustrative of the present disclosure and are not intended to limit the present disclosure to them.

While the present disclosure has been described in detail with reference to the embodiments thereof, it would be apparent to those skilled in the art that the various changes and modifications may be made therein within the scope defined by the appended claims.

What is claimed is:

1. An information processing apparatus comprising:

an operation device that accepts an input of a user's instruction;

a display device in a rectangular shape having longer sides and shorter sides;

a rotation mechanism capable of rotating the display device between a landscape orientation with the longer sides being top and bottom and a portrait orientation with the shorter sides being top and bottom;

a detection sensor that detects whether the display device is in the landscape orientation or the portrait orientation; and a control device that includes a processor and functions, through the processor executing a control program, as a controller that allows the display device to display an operation screen including a preview display area where a preview of an image represented by image data is to be displayed and, during detection of the landscape orientation of the display device by the detection sensor, allows the preview to be displayed in the preview display area to make top and bottom edges of the preview parallel to the longer sides of the display device, wherein when the operation device accepts an instruction to enlarge the preview while the landscape orientation of the display device is detected by the detection sensor and the operation screen is displayed on the display device, the controller enlarges the preview display area to change the preview display area to a first enlarged size and allows the preview to be displayed in a size enlarged to fit the preview display area enlarged to the first enlarged size, and when orientation of the display device being detected by the detection sensor changes from the landscape orientation to the portrait orientation while the preview is displayed on the preview display area enlarged to the first enlarged size and enlarged in accordance with the enlargement to the first enlarged size, the controller further enlarges the preview display area to change the preview display area from the first enlarged size to a second enlarged size that is larger than the first enlarged size and allows the preview to be displayed in a size further enlarged to fit the preview display area enlarged to the second enlarged size and displayed to make the top and bottom edges of the preview parallel to the shorter sides of the display device, when orientation of the display device being detected by the detection sensor changes from the landscape orientation to the portrait orientation while the preview is displayed on the preview display area having an original size before enlargement to the first enlarged size, the controller refrains from enlarging the preview display area and refrains from displaying the preview in an enlarged size.

2. The information processing apparatus according to claim 1, wherein when the landscape orientation of the display device is detected by the detection sensor and the controller allows the display device to display the preview in the size enlarged to fit the preview display area enlarged to the first enlarged size, the controller allows the display device to display a message indicating that the preview is able to be displayed in a further enlarged size by rotating the display device to the portrait orientation.

3. The information processing apparatus according to claim 1, wherein when the operation device accepts the instruction to enlarge the preview while the operation screen is displayed on the display device and the portrait orientation of the display device is detected by the detection sensor, the controller enlarges the preview display area to change the preview display area to the second enlarged size and allows the preview to be displayed in a size enlarged to fit the preview display area enlarged to the second enlarged size and displayed to make the top and bottom edges of the preview parallel to the shorter sides of the display device.

4. The information processing apparatus according to claim 1, wherein in allowing the preview to be displayed in the preview display area enlarged to the second enlarged size, the controller hides an operating key unrelated to input of an instruction involved in displaying the preview and enlarges the preview display area to an area where the unrelated operating key is hidden.

5. An image forming apparatus comprising:

the information processing apparatus according to claim 1; and an image forming device that forms an image on a recording medium, the controller allowing the display device to display a preview of an image to be formed by the image forming device.

* * * * *